United States Patent
Kanno et al.

(10) Patent No.: US 9,977,734 B2
(45) Date of Patent: May 22, 2018

(54) INFORMATION PROCESSING DEVICE, NON-TRANSITORY COMPUTER READABLE RECORDING MEDIUM, AND INFORMATION PROCESSING SYSTEM

(71) Applicant: Toshiba Memory Corporation, Minato-ku, Tokyo (JP)

(72) Inventors: Shinichi Kanno, Tokyo (JP); Daisuke Hashimoto, Musashino Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 8 days.

(21) Appl. No.: 14/656,413

(22) Filed: Mar. 12, 2015

(65) Prior Publication Data

US 2016/0170903 A1 Jun. 16, 2016

Related U.S. Application Data

(60) Provisional application No. 62/090,690, filed on Dec. 11, 2014.

(51) Int. Cl.
*G06F 12/10* (2016.01)
*G06F 12/02* (2006.01)

(52) U.S. Cl.
CPC .. *G06F 12/0246* (2013.01); *G06F 2212/7201* (2013.01); *G06F 2212/7202* (2013.01); *G06F 2212/7205* (2013.01); *G06F 2212/7207* (2013.01)

(58) Field of Classification Search
CPC ........... G06F 12/1036; G06F 2212/202; G06F 2212/657; G06F 12/0246; G06F 2212/7201; G06F 2212/7207; G06F 2212/7205; G06F 2212/7202
See application file for complete search history.

(56) References Cited

U.S. PATENT DOCUMENTS

| | | | |
|---|---|---|---|
| 7,739,444 B2 | 6/2010 | Sinclair et al. | |
| 7,913,051 B1 * | 3/2011 | Todd ................ | G06F 17/30097 711/108 |
| 2009/0164702 A1 * | 6/2009 | Kern ................... | G06F 12/0246 711/103 |
| 2012/0254581 A1 * | 10/2012 | Kim ..................... | G11C 11/5621 711/203 |
| 2013/0138867 A1 | 5/2013 | Craft et al. | |
| 2013/0227201 A1 * | 8/2013 | Talagala ............. | G06F 12/0246 711/103 |
| 2013/0282994 A1 * | 10/2013 | Wires .................. | G06F 3/0604 711/158 |
| 2014/0095827 A1 * | 4/2014 | Wei ..................... | G06F 12/0246 711/203 |

(Continued)

*Primary Examiner* — Daniel Tsui
*Assistant Examiner* — Zubair Ahmed
(74) *Attorney, Agent, or Firm* — White & Case LLP (57) ABSTRACT

According to one embodiment, an information processing device includes a nonvolatile memory, assignment unit, and transmission unit. The assignment unit assigns logical address spaces to spaces. Each of the spaces is assigned to at least one write management area included in a nonvolatile memory. The write management area is a unit of an area which manages the number of write. The transmission unit transmits a command for the nonvolatile memory and identification data of a space assigned to a logical address space corresponding to the command.

12 Claims, 9 Drawing Sheets

(56) References Cited

U.S. PATENT DOCUMENTS

2014/0195725 A1 7/2014 Bennett
2014/0281040 A1* 9/2014 Liu .......................... G06F 9/50
710/3

* cited by examiner

INFORMATION PROCESSING DEVICE, NON-TRANSITORY COMPUTER READABLE RECORDING MEDIUM, AND INFORMATION PROCESSING SYSTEM

CROSS-REFERENCE TO RELATED APPLICATIONS

This application claims the benefit of U.S. Provisional Application No. 62/090,690, filed Dec. 11, 2014, the entire contents of which are incorporated herein by reference.

FIELD

Embodiments described herein relate generally to an information processing device, non-transitory computer readable recording medium, and information processing system.

BACKGROUND

A solid state drive (SSD) includes a nonvolatile semiconductor memory and has an interface which is similar to that of a hard disk drive (HDD). For example, at the time of data writing, the SSD receives a write command, logical block addressing (LBA) of a writing destination, and write data from an information processing device, translates the LBA into physical block addressing (PBA) based on a lookup table (LUT), and writes the write data to a position indicated by the PBA.

DETAILED DESCRIPTION

In general, according to one embodiment, an information processing device includes an assignment unit, and transmission unit. The assignment unit assigns logical address spaces to spaces. Each of the spaces is assigned to at least one write management area of write management areas included in a nonvolatile memory. The write management area is a unit of an area which manages the number of write. The transmission unit transmits a command for the nonvolatile memory and identification data of a space assigned to a logical address space corresponding to the command.

Embodiments will be described hereinafter with reference to drawings. In a following description, the same reference numerals denote components having nearly the same functions and arrangements, and a repetitive description thereof will be given if necessary. In the following embodiments, access means both data reading and data writing.

First Embodiment

Figure 1:
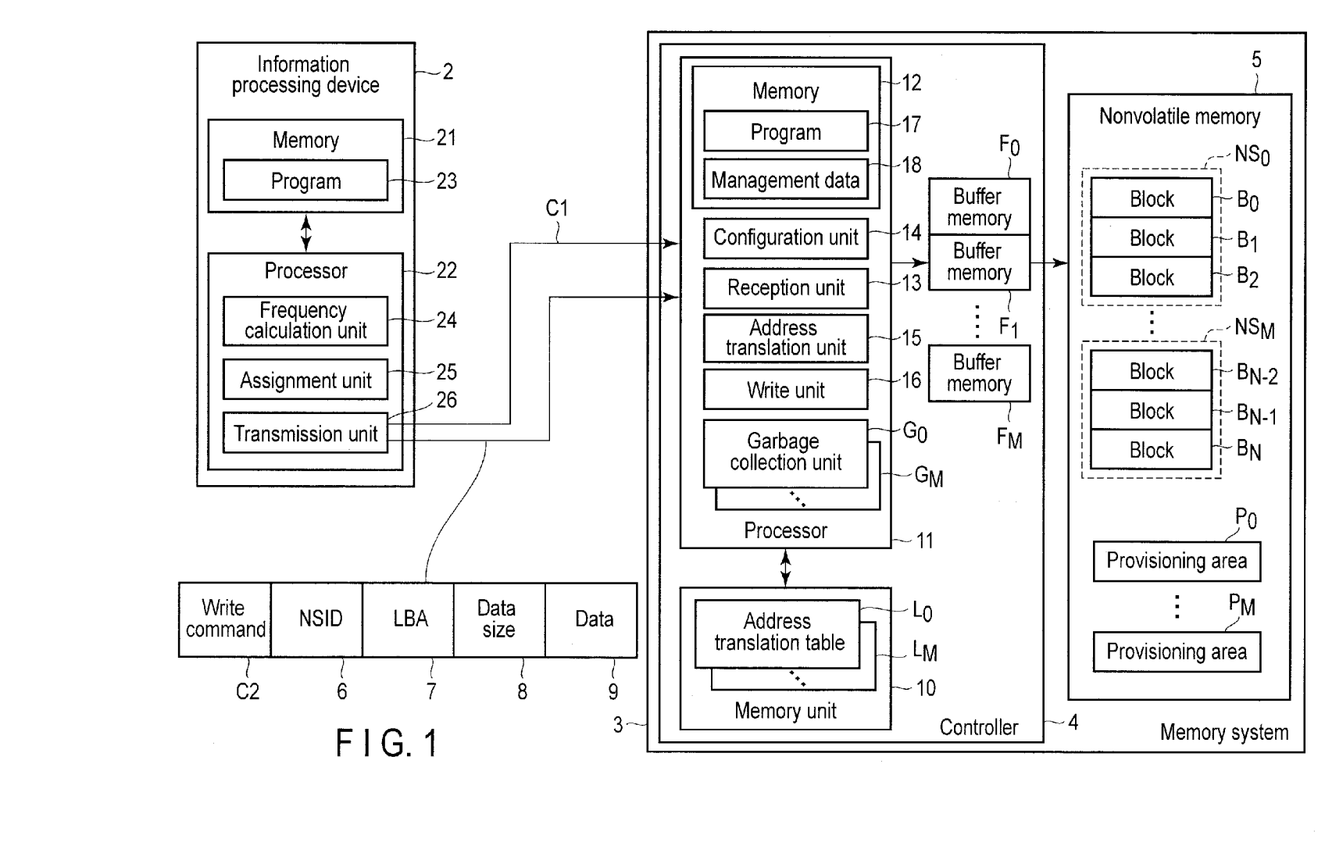
FIG. 1 is a block diagram showing an example of a structure of an information processing system according to a first embodiment.

FIG. 1 is a block diagram showing an example of a structure of an information processing system according to the present embodiment.

An information processing system 1 includes an information processing device 2 and a memory system 3. The information processing system 1 may include a plurality of information processing device 2. A case where the information processing system 1 includes a plurality of information processing device 2 is explained later in a second embodiment.

(Explanation of the Memory System 3)

The memory system 3 is, for example, an SSD, and includes a controller 4 and a nonvolatile memory 5. The memory system 3 may be included in the information processing device 2, and the information processing device 2 and the memory system 3 may be connected through a network in a data communicative manner.

In the present embodiment, at least one NAND flash memory is used as the nonvolatile memory 5. However, the present embodiment can be applied to various nonvolatile memories including a plurality of write management areas, and such various nonvolatile memories may be, for example, a NOR flash memory, magnetoresistive random access memory (MRAM), phase change random access memory (PRAM), resistive random access memory (ReRAM), and ferroelectric random access memory (FeRAM). Here, the write management area is an area of a unit which manages the number of writes. The nonvolatile memory 5 may include a three dimensional memory.

For example, the nonvolatile memory 5 includes a plurality of blocks (physical blocks). The plurality of blocks include a plurality of memory cells arranged at crossing points of word lines and bit lines. In the nonvolatile memory 5, data are erased at once block by block. That is, a block is an area of a unit of data erase. Data write and data read are performed page by page (word line by word line) in each block. That is, a page is an area of a unit of data write or an area of a unit of data read.

In the present embodiment, the number of writes is managed block by block.

The information processing device 2 is a host device of the memory system 3. The information processing device 2 sends a configuration command C1 which associates the blocks of the nonvolatile memory 5 with a space including at least one block to the memory system 3.

In the following description, the space will be explained as a namespace.

Furthermore, the information processing device 2 sends a write command C2 together with namespace identification data (NSID) 6, LBA7 which indicates a writing destination, data size 8 of the write data, and write data 9 to the memory system 3.

In the present embodiment, a plurality of namespaces $NS_0$ to $NS_M$ (M is an integer which is 1 or more) are each space which can be obtained from dividing a plurality of blocks $B_0$ to $B_N$ (N is an integer which is M or more) included in the nonvolatile memory 5. In the present embodiment, the namespace $NS_0$ includes the blocks $B_0$ to $B_2$, and the namespace $NS_M$ includes the blocks $B_{N-2}$ to $B_N$. The other namespaces $NS_1$ to $NS_{M-1}$ are the same as the namespaces $NS_0$ and $NS_M$. Note that the assignment relationship between the namespaces $NS_0$ to $NS_M$ and the blocks $B_0$ to $B_N$ is an example, and the number of the blocks to be assigned to a single namespace can be arbitrarily changed. The number of blocks may be different between namespaces.

The controller 4 includes a memory unit 10, buffer memories $F_0$ to $F_M$, and a processor 11.

The memory unit 10 stores address translation tables $T_0$ to $T_M$ corresponding to their respective namespaces $NS_0$ to $NS_M$. For example, the memory unit 10 may be used as a work memory. The memory unit 10 may be a volatile memory such as dynamic random access memory (DRAM) or static random access memory (SRAM), or may be a nonvolatile memory. The memory unit 10 may be a combination of a volatile memory and a nonvolatile memory.

Each of address translation tables $T_0$ to $T_M$ is data associating LBA with PBA based on the data write with respect to namespaces $NS_0$ to $NS_M$, and may be LUT, for example. Note that a part of or the whole address translation tables T0 to $T_M$ may be stored in a different memory such as memory 12.

Each of buffer memories $F_0$ to $F_M$ stores the write data until the data amount becomes suitable based on the data write with respect to namespaces $NS_0$ to $NS_M$.

The processor 11 includes a memory 12, reception unit 13, configuration unit 14, address translation unit 15, write unit 16, and garbage collection unit $G_0$ to $G_M$.

The memory 12 stores a program 17 and management data 18. In the present embodiment, the memory 12 is included in the processor 11; however, it may be provided outside the processor 11. The memory 12 is, for example, a nonvolatile memory. Note that a part of or the whole program 17 and management data 18 may be stored in a different memory such as the memory unit 10.

The program 17 is, for example, a firmware. The processor 11 executes the program 17 to function as the reception unit 13, configuration unit 14, address translation unit 15, write unit 16, and garbage collection units $G_0$ to $G_M$.

The management data 18 indicates a relationship between the namespaces $NS_0$ to $NS_M$ and the blocks $B_0$ to $B_N$. Referring to the management data 18, which block is in which namespace can be determined.

The reception unit 13 receives, from the information processing device 2, the configuration command C1 to associate each block with each namespace in the nonvolatile memory 5. Furthermore, the reception unit 13 receives, from the information processing device 2, the write command C2, NSID6, LBA7, data size 8, and data 9.

In the following description, a case where the write commend C2 is with the NSID6 which represents the namespace $NS_0$ is explained for the sake of simplification. However, the write command C2 can be with the NSID which represents the other namespaces $NS_1$ to $NS_M$.

When the reception unit 13 receives the configuration command C1 of the namespace, the configuration unit 14 assigns the blocks $B_0$ to $B_N$ to the namespaces $NS_0$ to $NS_M$ to generate the management data 18 and stores the management data 18 in the memory 12. The assignment of the blocks $B_0$ to $B_N$ to the namespaces $NS_0$ to $NS_M$ may be performed by the configuration unit 14 observing data storage conditions of the namespaces $NS_0$ to $NS_M$ in such a manner that the data capacities, access frequencies, write frequencies, the numbers of accesses, the numbers of writes, or data storage ratios are set to the same level between the namespaces $NS_0$ to $NS_M$. Or, the assignment may be performed based on an instruction from the information processing device 2, or an instruction from the manager of the memory system 3.

The data capacity here is a writable data size, the access frequency or the write frequency is the number of accesses or the number of writes per unit time, and the data storage ratio is a value which indicates a ratio of an area size which the data is already stored with respect to an area size.

Furthermore, the configuration unit 14 transfers an empty block in which no data is stored from a namespace categorized as pre-garbage collection to the other namespace based on the garbage collection result executed for each of the namespaces $NS_0$ to $NS_M$, and updates the management data 18. Thus, the wear leveling can be performed between the namespaces $NS_0$ to $NS_M$. The assignment change between the namespaces $NS_0$ to $NS_M$ and the blocks $B_0$ to $B_N$ may be performed by the configuration unit 14 observing the data storage conditions of the namespaces $NS_0$ to $NS_M$ based on an observation result as in the time of generation of the management data 18. Or, the assignment change may be performed based on an instruction from the information processing device 2 or an instruction from the manager of the memory system 3. For example, the change of the namespaces $NS_0$ to $NS_M$ are performed to convert the empty block of the namespace with lower data capacity, lower access frequency, lower number of access, or lower data storage ratio to the namespace with higher data capacity, higher access frequency, higher number of access, or higher data storage ratio.

Furthermore, the configuration unit 14 sets provisioning areas $P_0$ to $P_M$ which are not normally used for each of the namespaces $NS_0$ to $NS_M$ in the nonvolatile memory 5 based on the configuration command C1 for over provisioning. The setting of the provisioning areas $P_0$ to $P_M$ may be performed by the configuration unit 14 based on the data capacity of each of the namespaces $NS_0$ to $NS_M$. Or, the setting may be performed based on an instruction from the information processing device 2, or an instruction from the manager of the memory system 3.

In the present embodiment, the provisioning areas $P_0$ to $P_M$ are secured in the nonvolatile memory 5; however, they may be secured in any other memory in the memory system 3. For example, the provisioning areas $P_0$ to $P_M$ may be secured in a memory such as DRAM or SRAM.

When the reception unit 13 receives the write command C2, the address translation unit 15 executes associating to translate the LBA7 with the write command C2 into the PBA for the address translation table $T_0$ corresponding to the namespace $NS_0$ which indicates the NSID 6 with the write command C2.

In the present embodiment, the address translation unit 15 is achieved by the processor 11; however, the address translation unit 15 may be structured separately from the processor 11.

Furthermore, the address translation unit 15 performs the address translation based on the address translation tables $T_0$ to $T_M$; however, the address translation may be performed by a key-value type retrieval. For example, the LBA is set as a key and the PBA is set as a value for achieving the address translation by key-value type retrieval.

The write unit 16 writes the write data 9 in a position indicated by the PBA obtained from the address translation unit 15. In the present embodiment, the write unit 16 stores the write data 9 in the buffer memory $F_0$ corresponding to the namespace $NS_0$ indicated by the NSID6 with the write command C2. Then, the write unit 16 writes the data of the buffer memory $F_0$ to a position indicated by the PBA when the buffer memory $F_0$ reaches the data amount suitable for the namespace $NS_0$.

The garbage collection units $G_0$ to $G_M$ correspond to the namespaces $NS_0$ to $NS_M$ and execute the garbage collection in each of the namespaces $NS_0$ to $NS_M$. The garbage collection is a process to release an unnecessary memory area or a process to secure a continuous available memory area by collecting data written in a memory area with gaps. The garbage collection units $G_0$ to $G_M$ may be configured to execute garbage collections in parallel, or consecutively.

The garbage collection is explained in detail using the garbage collection unit $G_0$ as an example selected from the garbage collection unit $G_0$ to $G_M$. The garbage collection unit $G_0$ first selects the blocks $B_0$ to $B_2$ corresponding to the namespace $NS_0$ based on the management data 18. Then, the garbage collection unit $G_0$ performs the garbage collection with respect to the selected blocks $B_0$ to $B_2$. Then, based on a result of the garbage collection performed by the garbage collection unit $G_0$, the address translation unit 15 updates the address translation table $T_0$.

Note that, in the present embodiment, the LBA and the PBA are associated with each other in the address translation tables $T_0$ to $T_M$ and the block identifiable by the PBA and the NSID are associated with each other in the management data 18. Therefore, when LBA is a unique address without redundant other LBA and the management data 18 is generated, the namespace $NS_0$ which is a writing destination can be specified from the LBA 7 attached to the write command C2 at the processor 11 side. Therefore, after the generation of the management data 18 without redundant LBA 7, attaching the NSID 6 to the write command C2 can be omitted, and the NSID 6 may be acquired at the processor 11 side based on the LBA 7, address translation tables $T_0$ to $T_M$, and management data 18.

Figure 2:
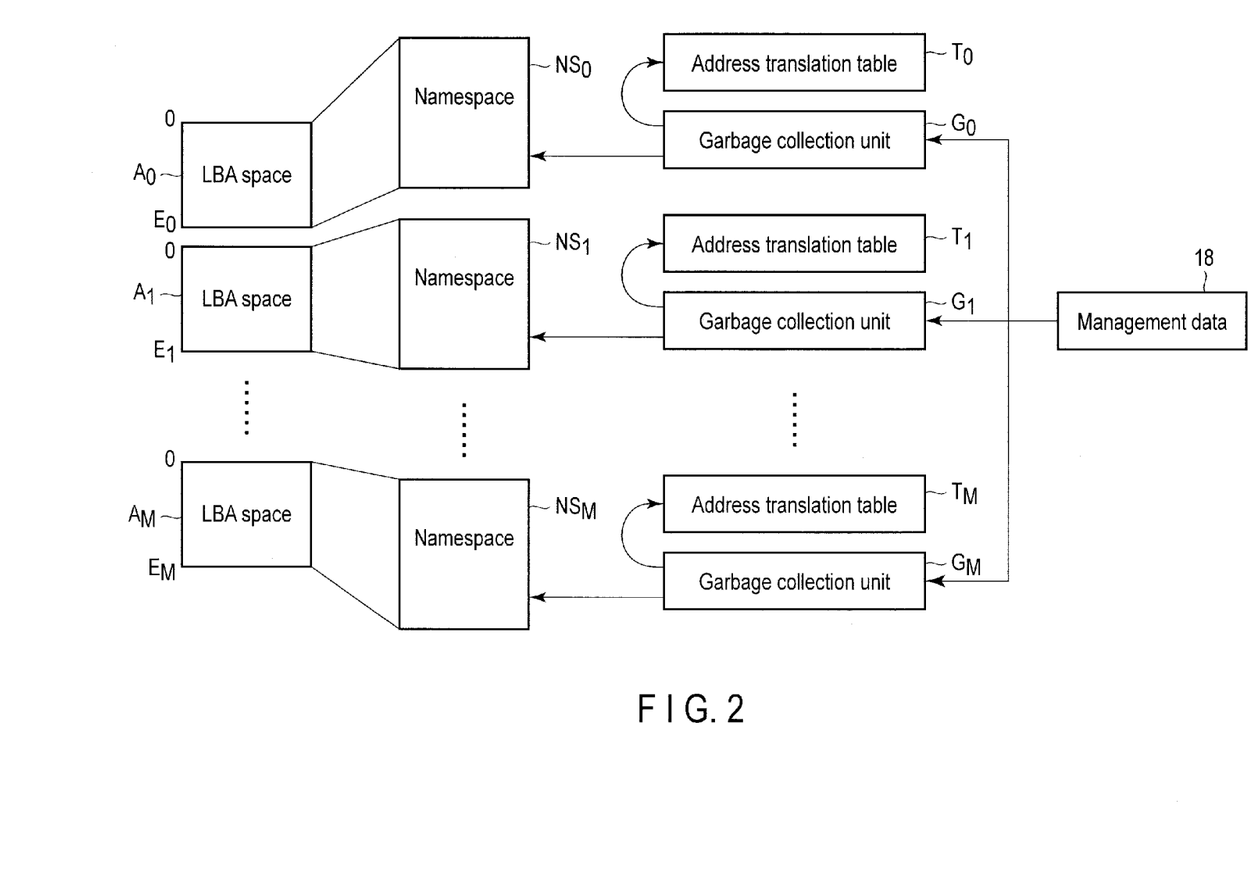
FIG. 2 is a block diagram showing an example of a relationship between LBA spaces, namespaces, address translation tables, garbage collection units, and management data.

FIG. 2 is a block diagram showing an example of a relationship between LBA spaces, the namespaces $NS_0$ to $NS_M$, the address translation tables $T_0$ to $T_M$, the garbage collection units $G_0$ to $G_M$, and the management data 18.

LBA spaces $A_0$ to $A_M$ of the information processing device 2 are assigned to the namespaces $NS_0$ to $NS_M$, respectively.

The LBA space $A_0$ includes logical addresses 0 to $E_0$. The LBA space $A_1$ includes logical addresses 0 to $E_1$. The LBA space $A_M$ includes logical addresses 0 to $E_M$. The other LBA spaces $A_2$ to $A_{M-1}$ include a plurality of logical addresses similarly.

In the following description, the LBA space $A_0$ and the namespace $NS_0$ assigned to the LBA space $A_0$ are explained representatively for the sake of simplification. However, the other LBA spaces $A_1$ to $A_M$ and namespaces NS' to $NS_M$ are structured the same.

When writing the data of the LBA space $A_0$ to the nonvolatile memory 5, the information processing device 2 sends the write command C2, NSID 6 indicating the namespace $NS_0$ corresponding to the LBA space $A_0$, LBA 7 within LBA space $A_0$, data size 8, and write data 9 corresponding to the LBA 7 to the memory system 3.

The management data 18 associates the namespace $NS_0$ with the blocks $B_0$ to $B_2$.

The garbage collection unit $G_0$ performs the garbage collection with respect to the blocks $B_0$ to $B_2$ included in the namespace $NS_0$ corresponding to the garbage collection unit $G_0$ based on the management data 18.

As a result of the garbage collection, data arrangement will be changed within the blocks $B_0$ to $B_2$. Therefore, the garbage collection unit $G_0$ instructs the address translation unit 15 which is omitted in FIG. 2 to perform the update of address translation table $T_0$. The address translation unit 15 updates the address translation table $T_0$ corresponding to the namespace $NS_0$ to match the data arrangement after the garbage collection.

Figure 3:
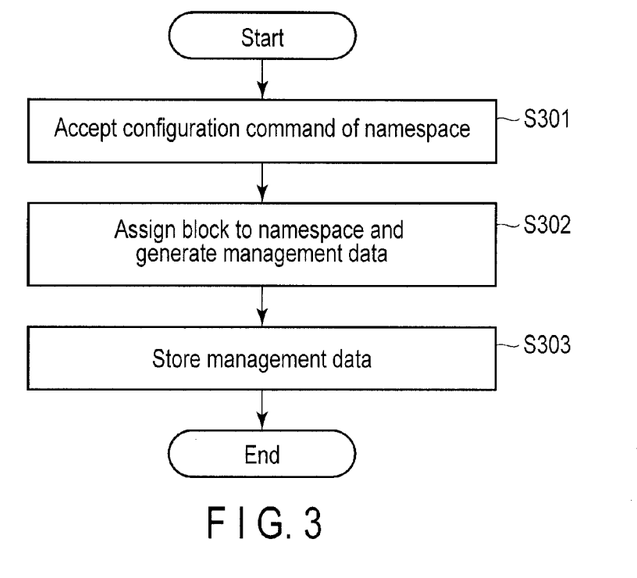
FIG. 3 is a flowchart showing an example of a process performed by a reception unit and a configuration unit according to the first embodiment.

FIG. 3 is a flowchart showing an example of a process performed by the reception unit 13 and the configuration unit 14 according to the present embodiment.

In step S301, the reception unit 13 receives the configuration command C1 of the namespaces $NS_0$ to $NS_M$.

In step S302, the configuration unit 14 assigns the blocks $B_0$ to $B_N$ of the nonvolatile memory 5 to the namespaces $NS_0$ to $NS_M$ and generates the management data 18.

In step S303, the configuration unit 14 stores the management data 18 in the memory 12.

Figure 4:
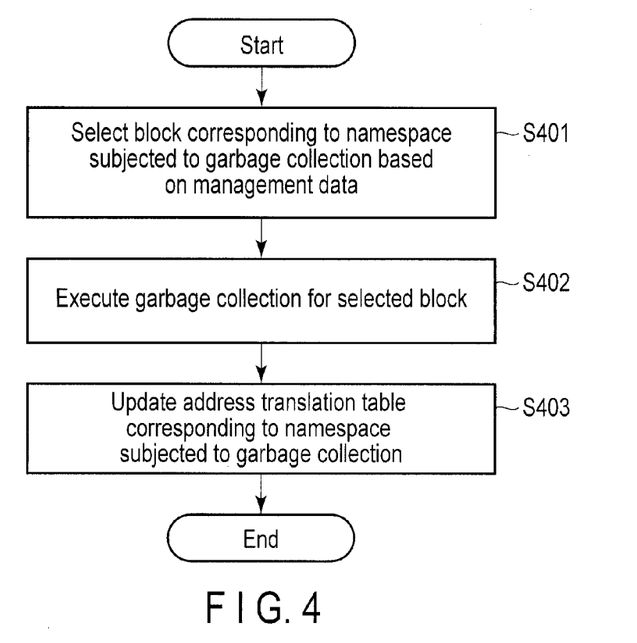
FIG. 4 is a flow chart showing an example of a process performed by a garbage collection unit and an address translation unit according to the first embodiment.

FIG. 4 is a flow chart showing an example of a process performed by the garbage collection unit $G_0$ and the address translation unit 15 according to the present embodiment. Note that the same process is executed in the other garbage collection units $G_1$ to $G_M$. The process shown in FIG. 4 may be performed based on an instruction from the information processing device 2, for example. Or, the process may be performed based on an instruction from the manager of the memory system 3. Furthermore, the garbage collection unit $G_0$ may execute the process of FIG. 4 voluntarily by, for example, observing the data storage condition of the namespace $NS_0$ of the garbage collection target and determining the start of the garbage collection appropriately. More specifically, the garbage collection unit $G_0$ executes the garbage collection with respect to the namespace $NS_0$ when the number of empty blocks within the namespace $NS_0$ is a predetermined number or less, or when a ratio of empty blocks to the whole blocks within the namespace $NS_0$ is a predetermined value or less.

In step S401, the garbage collection unit $G_0$ selects the blocks $B_0$ to $B_2$ corresponding to the namespace $NS_0$ which is the garbage collection target based on the management data 18.

In step S402, the garbage collection unit $G_0$ executes the garbage collection with respect to the blocks $B_0$ to $B_2$ within the selected namespace $NS_0$.

In step S403, the address translation unit 15 updates the address translation table $T_0$ corresponding to the namespace $NS_0$ which is the garbage collection target based on the conditions of the blocks $B_0$ to $B_2$ after the garbage collection.

In the present embodiment explained as above, a predetermined block amount or a block amount set by the information processing device 2 can be assigned to each of the namespaces $NS_0$ to $NS_M$, and the data corresponding to the namespaces $NS_0$ to $NS_M$ can be written to the blocks $B_0$ to $B_M$ assigned to the namespaces $NS_0$ to $NS_M$, and different data amounts can be set to the namespaces $NS_0$ to $NS_M$.

In the present embodiment, the garbage collection can be performed in each of the namespaces $NS_0$ to $NS_M$ independently and efficiently.

In the present embodiment, as a result of the garbage collection, the empty block which do not store data can be transferred from the namespace before the garbage collection to the other namespace, and the empty block can be secured within the other namespace. Therefore, the namespace to be assigned to the block can be changed, the wear leveling can be performed between the namespaces $NS_0$ to $NS_M$, and the life of the nonvolatile memory 5 can be prolonged.

In the present embodiment, the provisioning areas $P_0$ to $P_M$ having different data amounts can be set in each of the namespaces $NS_0$ to $NS_M$, and the over provisioning can be achieved in each of the namespaces $NS_0$ to $NS_M$. Thus, the write speed can be accelerated and performance can be maintained, and consequently, the reliability can be improved.

In the present embodiment, the address translation tables $T_0$ to $T_M$ are managed for each of the namespaces $NS_0$ to $NS_M$, and the address translation and changing of the relationship between the LBA and PBA can be performed efficiently in each of the namespaces $NS_0$ to $NS_M$.

In the present embodiment, if the address translation is performed by the key-value type retrieval, even the data volume of the nonvolatile memory 5 is large, the address translation can be performed efficiently.

In the present embodiment, highly sophisticated memory management can be achieved in each of the namespaces $NS_0$ to $NS_M$, the life of the nonvolatile memory 5 can be prolonged, the production costs can be reduced, and write/read processes to/from the nonvolatile memory 5 divided by the namespaces $NS_0$ to $NS_M$ can be rapid.

(Explanation of Information Processing Device 2)

The information processing device 2 includes a memory 21 and a processor 22.

In the information processing device 2, various programs, including application programs and operating systems, (hereinafter referred to as an object or objects) and various kinds of data can be identified by object identification data (hereinafter referred to as an object ID or object IDs).

The information processing device 2 assigns LBA spaces $A_0$ to $A_M$ to objects, and manages LBA spaces $A_0$ to $A_M$ assigned to each of the objects identified by their respective object IDs.

The memory 21 is, for example, a nonvolatile memory for storing a program 23.

The processor 22 executes the program 23 stored in the memory 21 to function as a frequency calculation unit 24, an assignment unit 25 and a transmission unit 26.

The frequency calculation unit 24 calculates the write frequency for each of the LBA spaces corresponding to each of the objects.

The assignment unit 25 assigns the LBA spaces $A_0$ to $A_M$ to the namespaces $NS_0$ to $NS_M$ based on the write frequency for each of the LBA spaces corresponding to each of the objects.

The transmission unit 26 generates the configuration command C1 based on an assignment result of the assignment unit 25, and transmits the configuration command C1 to the memory system 3.

The transmission unit 26 furthermore generates the write command C2 based on the assignment result of the assignment unit 25, and transmits the write command C2, the NSID 6 which represents the namespace $NS_0$ assigned to an LBA space of an object transmitting the write command C2, the data size 8 and the write data 9 to the memory system 3.

Figure 5:
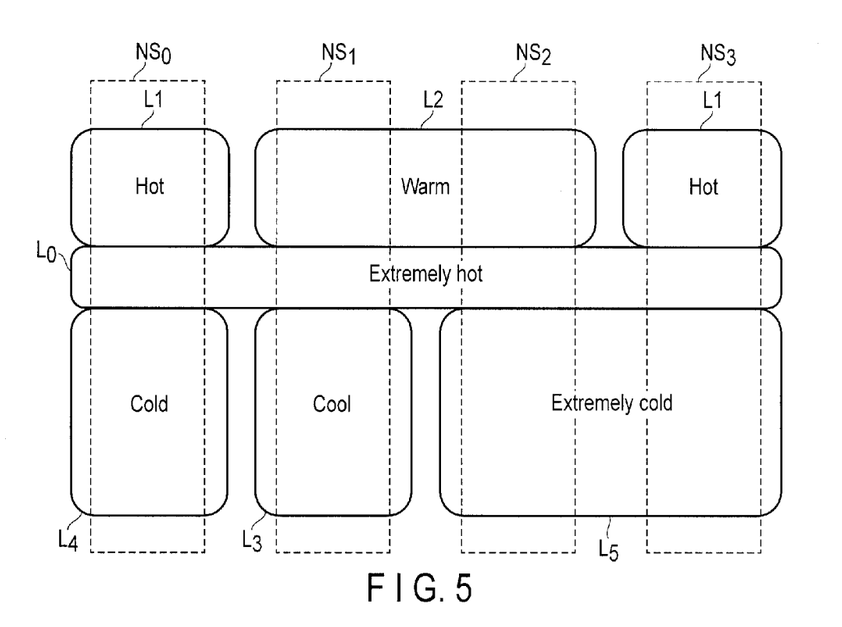
FIG. 5 is a block diagram showing an example of an allocating state of namespaces according to the first embodiment.

FIG. 5 is a block diagram showing an example of an allocating state of namespaces according to the present embodiment.

FIG. 5 illustrates a state in which the LBA spaces of the objects are assigned to four namespaces $NS_0$ to $NS_3$. However, the number of the namespaces may be two or more.

The write frequencies for the LBA spaces of the objects are assigned to any one of the write frequency groups. FIG. 5 illustrates a case in which six write frequency groups $L_0$ to $L_5$ are used. Write frequency groups $L_0$ to $L_5$ are successively designated as follows from high to low in write frequencies: the write frequency group $L_0$ is designated "Extremely Hot"; the write frequency group $L_1$, "Hot"; the write frequency group $L_2$, "Warm"; the write frequency group $L_3$, "Cool"; the write frequency group $L_4$, "Cold"; and the write frequency group $L_5$, "Extremely Cold".

The write frequency groups $L_0$ to $L_5$ are assigned to the namespaces $NS_0$ to $NS_3$ based on both their respective characteristic features and their respective object IDs.

For example, the write frequency groups $L_0$ to $L_5$ are assigned to the namespaces $NS_0$ to $NS_3$ in such a manner that the write frequency groups having different characteristic features are included in the same namespace.

For example, the write frequency group $L_0$ is extremely high in write frequency, which means that extra regions must be secured plentifully. Therefore, the write frequency group $L_0$ is assigned to the name spaces $NS_0$ to $NS_3$. This arrangement makes it possible to use extra regions efficiently.

For example, the write frequency group $L_5$, which is extremely low in write frequency, is dividedly assigned to the namespaces $NS_2$ and $NS_3$. The divisional assignment of the write frequency group $L_5$ to the namespaces $NS_2$ and $NS_3$ improves efficiency of the garbage collection.

For example, the write frequency group $L_1$, which is high in write frequency, is assigned to the namespaces $NS_0$ or $NS_3$ on an object basis, and the LBA space of one object is assigned to one namespace $NS_0$ or $NS_3$, so that the garbage collection will be independently executed on an object basis such as on a user application basis. Therefore, when the garbage collection is executed for a certain user application, the performance of the other user application is prevented from deteriorating.

Figure 6:
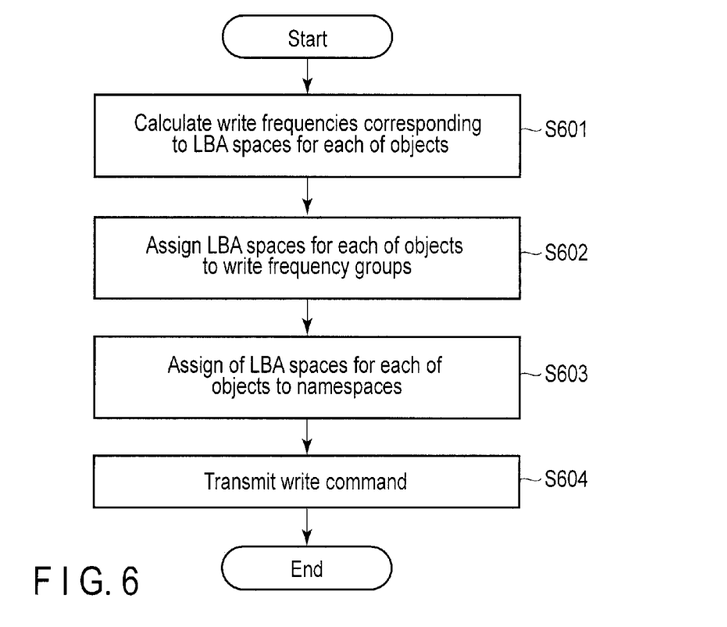
FIG. 6 is a flow chart showing an example of a process executed by the information processing device according to the first embodiment.

FIG. 6 is a flowchart showing an example of a process executed by the information processing device 2 according to the present embodiment.

In Step S601, the frequency calculation unit 24 calculates the write frequency for each of the LBA spaces corresponding to each of the objects.

In Step S602, the assignment unit 25 assigns the LBA space for each of the objects to any one of write frequency groups $L_0$ to $L_5$ based on the write frequency corresponding to the LBA spaces for each of the objects.

In Step S603, the assignment unit 25 assigns each of the LBA spaces to at least one of namespaces $NS_0$ to $NS_M$ based on each object ID and write frequency groups $L_0$ to $L_5$.

In Step S604, the transmission unit 26 transmits the write command C2, the NSID 6 which represents the assignment result of the namespaces $NS_0$ to $NS_M$, the LBA 7, the data size 8 and the write data 9 to the memory system 3.

In the present embodiment explained above, the LBA spaces $A_0$ to $A_M$ for each of the objects are assigned to the namespaces $NS_0$ to $NS_M$ based on the write frequency for each of the LBA spaces corresponding to each of the objects. Therefore, the memory system 3 will be improved in service quality and device performance, prolonged in lifetime, and appropriate in setting.

For example, the present embodiment makes it possible to adjust the write frequency and the number of writes for each of namespaces $NS_0$ to $NS_3$ by assigning different LBA spaces having characteristic features to one of the namespaces.

For example, in the present embodiment, an LBA space being extremely high in write frequency can be assigned to a plurality of namespaces, which makes it possible to secure extra regions plentifully.

For example, an LBA space being extremely low in write frequency can be assigned to a plurality of namespaces in the present embodiment, which makes it possible to make garbage collection efficient.

For example, in the present embodiment, an LBA space of an object being high in write frequency is assigned to one of the namespaces. Therefore, when the garbage collection is executed for a certain user application, the performance of the other user application is prevented from deteriorating.

In the present embodiment, both the assignment of the LBA spaces $A_0$ to $A_M$ and the assignment of the name spaces $NS_0$ to $NS_M$ are executed based on write frequencies. Instead, however, other information such as a combination of the numbers of writes, write frequencies and read frequencies may be used to execute both the assignment of the LBA spaces $A_0$ to $A_M$ and the assignment of the namespaces $NS_0$ to $NS_M$.

Furthermore, it is possible to cause the assignment unit 25 respectively assign the LBA spaces $A_0$ to $A_M$ to the namespaces $NS_0$ to $NS_M$ based on the user setting.

In the present embodiment, a compaction unit of each of the namespaces $NS_0$ to $NS_M$ may be provided instead of or together with garbage collection units $G_0$ to $G_M$. The compaction unit corresponding to each of namespaces $NS_0$ to $NS_M$ executes compaction with respect to each of the namespaces $NS_0$ to $NS_M$ based on the management data 18.

In the present embodiment, the communication of configuration command C1 between, for example, the information processing device 2 and the memory system 3 may be omitted. For example, the address translation unit 15 may include a part of or the whole functions of the configuration unit 14. For example, the address translation unit 15 may generate the management data 18 and address translation tables $T_0$ to $T_M$ of the namespaces $NS_0$ to $NS_M$ by associating the NSID 6 and LBA 7 added to the write command C2 with the PBA corresponding to the LBA 7. The management data 18 and the address translation tables $T_0$ to $T_M$ may be coupled or divided arbitrarily. The structure in which the communication of the configuration command C1 is omitted and the address translation unit 15 includes a part of or the whole functions of the configuration unit 14 is explained in detail in the following second embodiment.

Second Embodiment

In the present embodiment, explained is an information processing system in which a memory system writes write data from a plurality of information processing devices and sends the read data to the information processing devices.

Figure 7:
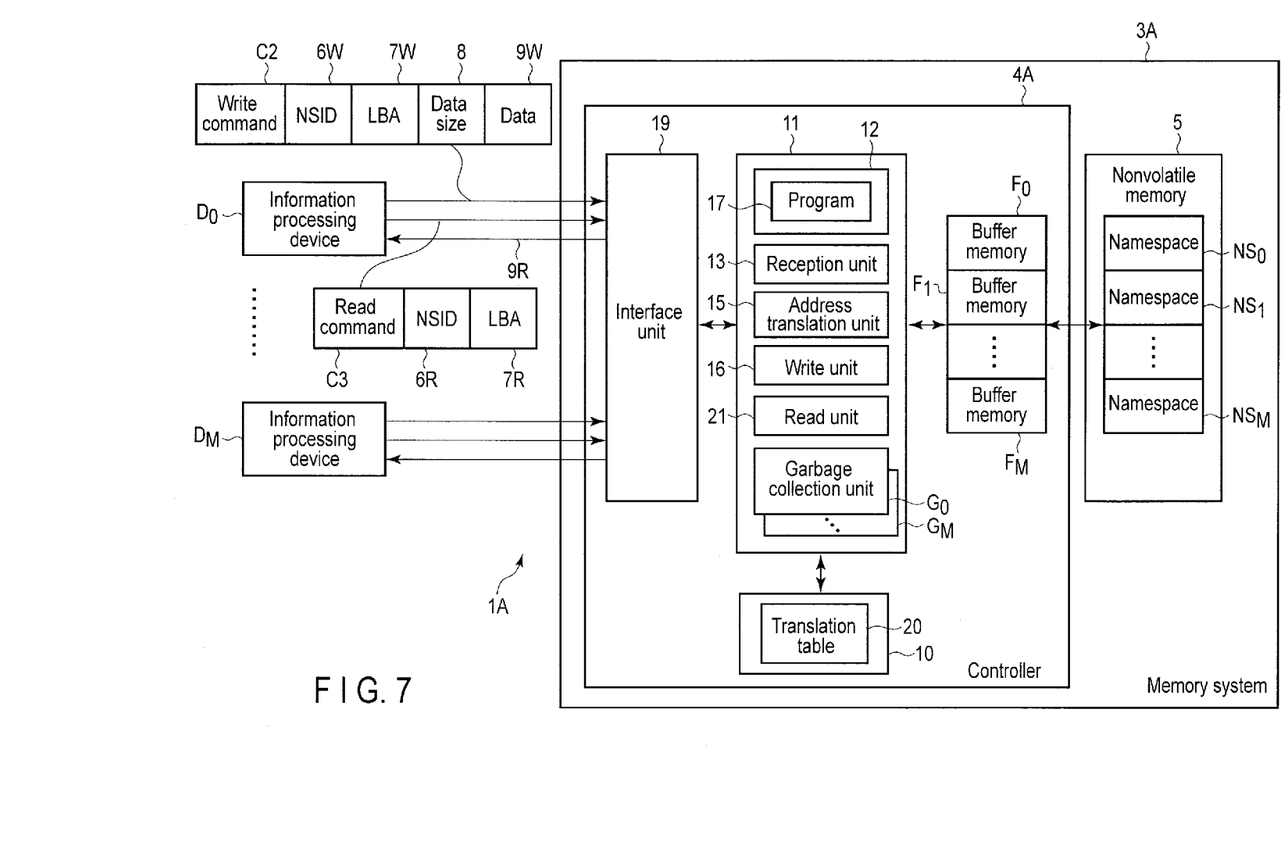
FIG. 7 is a block diagram showing an example of a structure of an information processing system of a second embodiment.

FIG. 7 is a block diagram showing an example of a structure of an information processing system of the present embodiment.

An information processing system 1A includes a plurality of information processing devices $D_0$ to $D_M$ and a memory system 3A. Each of the information processing devices $D_0$ to $D_M$ functions similarly to the information processing device 2. The memory system 3A differs from the above memory system 3 mainly because it includes a translation table (translation data) 20 instead of the address translation tables $T_0$ to $T_M$ and management data 18, it transmits/receives data, information, signal, and command to/from the information processing devices $D_0$ to $D_M$, and the address translation unit 15 functions as the configuration unit 14. In the present embodiment, differences from the first embodiment are explained, and the same explanation or substantially the same explanation may be omitted or simplified.

The memory system 3A is included in, for example, a cloud computing system. In the present embodiment, a case where the memory system 3A is shared with the information processing devices $D_0$ to $D_M$ is exemplified; however, it may be shared with a plurality of users. At least one of the information processing devices $D_0$ to $D_M$ may be a virtual machine.

In the present embodiment, NSID added to a command is used as an access key to namespaces.

In the present embodiment, the information processing devices $D_0$ to $D_M$ have access rights to their corresponding namespaces $NS_0$ to $NS_M$. However, only a single information processing device may have access rights to one or more namespaces, or a plurality of information processing devices may have an access right to a common namespace.

Each of the information processing devices $D_0$ to $D_M$ transfers, together with the write command C2, an NSID 6W indicative of its corresponding write destination space, LBA 7W indicative of the write destination, data size 8, and write data 9W to the memory system 3A.

Each of the information processing devices $D_0$ to $D_M$ transfers, together with a read command C3, an NSID 6R indicative of its corresponding read destination space, and LBA 7R indicative of the read destination to the memory system 3A.

Each of the information processing devices $D_0$ to $D_M$ receives read data 9R corresponding to the read command C3 or information indicative of a read error from the memory system 3A.

The memory system 3A includes a controller 4A and the nonvolatile memory 5.

The controller 4A includes an interface unit 19, memory unit 10, buffer memory $F_0$ to $F_M$, and processor 11. In the present embodiment, the number of processor 11 in the controller 4A can be changed optionally to be one or more.

The interface unit 19 transmits/receives data, information, signal, and command to/from external devices such as the information processing devices $D_0$ to $D_M$.

The memory unit 10 stores a translation table 20. A part of or the whole translation table 20 may be stored in a different memory such as the memory 12.

The translation table 20 is data which associates the LBA, PBA, and NSID with each other. The translation table 20 is explained later with reference to FIG. 8.

The buffer memories $F_0$ to $F_M$ are used for write buffer memories and read buffer memories with respect to namespaces $NS_0$ to $NS_M$.

The processor 11 includes the memory 12 storing the program 17, reception unit 13, address translation unit 15, write unit 16, read unit 21, and garbage collection units $G_0$ to $G_M$. When the program 17 is executed, the processor 11 functions as the reception unit 13, address translation unit 15, write unit 16, read unit 21, and garbage collection units $G_0$ to $G_M$.

The reception unit 13 receives, at the time of data write, the write command C2, NSID 6W, LBA 7W, data size 8, and write data 9W from the information processing devices $D_0$ to $D_M$ through the interface unit 19.

The reception unit 13 receives, at the time of data read, the read command C3, NSID 6R, and LBA 7R from the information processing devices $D_0$ to $D_M$ through the interface unit 19.

When the reception unit 13 receives the write command C2, based on the LBA 7W and NSID 6W added to the write command C2, the address translation unit 15 determines the PBA of the write destination in the namespace indicated by the NSID 6W. The address translation unit 15 then updates the translation table 20 associating the LBA 7W, NSID 6W, and determined PBA with each other.

When the read command C3 is received by the reception unit 13, based on the LBA 7R and NSID 6R added to the read command C3, and the translation table 20, the address translation unit 15 determines the PBA of the read destination indicated by the NSID 6R.

The write unit 16 writes the write data 9W at a position indicated by the PBA corresponding to the namespace indicated by the NSID 6W via a buffer memory corresponding to the namespace indicated by the NSID 6W.

The read unit 21 reads the read data 9R from the position indicated by the PBA corresponding to the namespace indicated by NSID 6R via the buffer memory corresponding to the namespace indicated by NSID 6R. Then, the read unit 21 sends the read data 9R to the information processing device issuing the read commend C3 via the interface unit 19.

In the present embodiment, the garbage collection units $G_0$ to $G_M$ execute garbage collection of each of the namespaces $NS_0$ to $NS_M$ based on the translation table 20.

Figure 8:
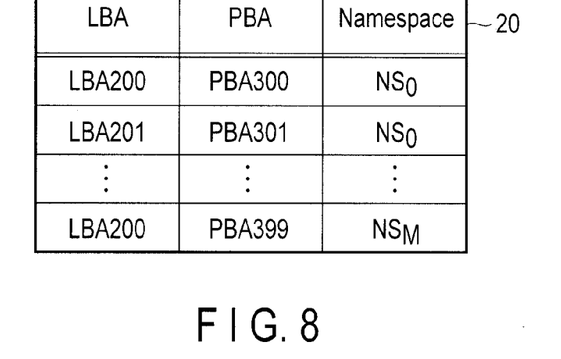
FIG. 8 is a data structural diagram showing an example of a translation table according to the second embodiment.

FIG. 8 is a data structural diagram showing an example of the translation table 20 according to the present embodiment.

The translation table 20 manages the LBA, PBA, and NSID with each other. For example, the translation table 20 associates the LBA 200, PBA 300, and $NS_0$ with each other. For example, the translation table 20 associates the LBA 201, PBA 301, and $NS_0$ with each other. For example, the translation table 20 associates the LBA 200, PBA 399, and NSM with each other.

The address translation unit 15 determines the PBA such that the PBA 300 associated with the LBA 200 and the NSID indicative of the namespace $NS_0$ and PBA 399 associated with the LBA 200 and the NSID indicative of the namespace $NS_M$ differ from each other.

Thus, the address translation unit 15 can select PBA 300 when the NSID received with the LBA 200 indicates the namespace $NS_0$ and select PBA 399 when the NSID received with the LBA 200 indicates the namespace $NS_M$.

Therefore, even if the same logical address is used between a plurality of information processing devices $D_0$ to $D_M$, the memory system 3A can be shared with the information processing devices $D_0$ to $D_M$.

Figure 9:
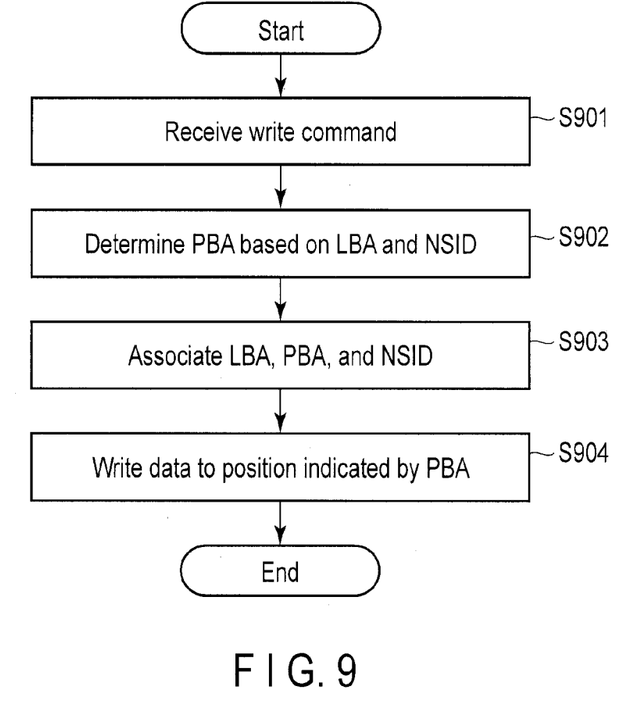
FIG. 9 is a flowchart showing an example of a write process of a memory system according to the second embodiment.

FIG. 9 is a flowchart showing an example of a write process of the memory system 3A according to the present embodiment.

As to FIG. 9, the explanation thereof is presented given that the write command C2 is issued from the information processing device $D_0$ amongst the information processing devices $D_0$ to $D_M$, and the NSID 6W which indicates the namespace $NS_0$ is added to the write command C2. However, the process is performed similarly when the write commend C2 is issued from any of the information processing devices $D_1$ to $D_M$. Furthermore, the process is performed similarly when the NSID 6W which indicates any of the other namespaces $NS_1$ to $NS_M$ is added to the write command C2.

In step S901, the reception unit 13 receives the write command C2, NSID 6W, LBA 7W, data size 8, and write data 9W from the information processing device $D_0$ via the interface unit 19.

In step S902, when the write command C2 is received by the reception unit 13, based on the LBA 7W and NSID 6W added to the write command C2, the address translation unit 15 determines the PBA of a write destination in the namespace $NS_0$ indicated by the NSID 6W.

In step S903, the address translation unit 15 updates the translation table 20 associating the LBA 7W, NSID 6W, determined PTA with each other.

In step S904, the write unit 16 writes the write data 9W at a position indicated by the PBA corresponding to the namespace $NS_0$ indicated by the NSID 6W via the buffer memory $F_0$ corresponding to the namespace $NS_0$ indicated by the NSID 6W.

Figure 10:
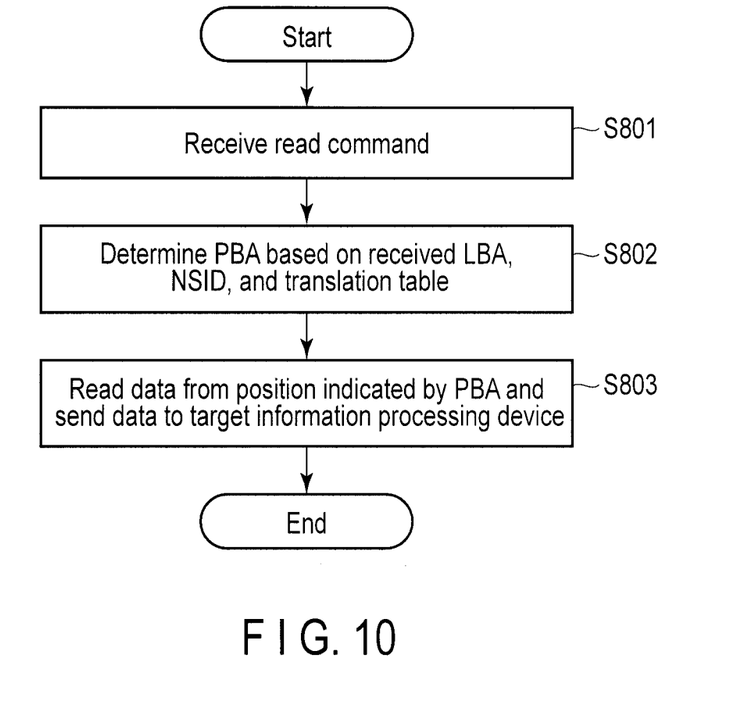
FIG. 10 is a flowchart showing an example of a read process of the memory system of the second embodiment.

FIG. 10 is a flowchart showing an example of a read process of the memory system 3A according to the present embodiment.

As to FIG. 10, the explanation is presented given that the read command C3 is issued from information processing device DM amongst the information processing devices $D_0$ to $D_M$, and the NSID 6R which indicates the namespace $NS_M$ is added to the read command C3. However, the process is performed similarly when the read commend C3 is issued from any of the information processing devices $D_1$ to $D_{M-1}$. Furthermore, the process is performed similarly when the NSID 6R which indicates any of the other namespaces $NS_1$ to $NS_{M-1}$ is added to the read command C3.

In step S1001, the reception unit 13 receives the read command C3, NSID 6R, and LBA 7R from the information processing device $D_M$ via the interface unit 19.

In step S1002, when the read command C3 is received by the reception unit 13, based on the LBA 7R and NSID 6R added to the read command C3, and translation table 20, the address translation unit 15 determines the PBA of a read destination.

In step S1003, the read unit 21 reads the read data 9R from the position indicated by PBA corresponding to the namespace $NS_M$ indicated by NSID 6R via the buffer memory $F_M$ corresponding to the namespace $NS_M$ indicated by NSID 6R, and sends the read data 9R to the information processing devices $D_M$ issuing the read command C3 via the interface unit 19.

In the present embodiment described above, the nonvolatile memory 5 is divided into a plurality of the namespaces $NS_0$ to $NS_M$. The information processing devices $D_0$ to $D_M$ can access the namespaces whose access rights are granted thereto. Consequently, data security can be improved.

The controller 4A of the memory system 3A controls the namespaces $NS_0$ to $NS_M$ independently space by space. Therefore, conditions of use of each of the namespaces $NS_0$ to $NS_M$ may be difference.

The memory system 3A associates the LBA, PBA, and NSID with each other, and thus, even if the same LBA sent from a plurality of independent information processing devices is received, the data can be distinguished based on the NSID.

In each of the above embodiments, data in a table format can be implemented as a different data structure such as a list format.

Third Embodiment

In the present embodiment, the information processing systems 1 and 1A explained in the first and second embodiments are further explained in detail.

Figure 11:
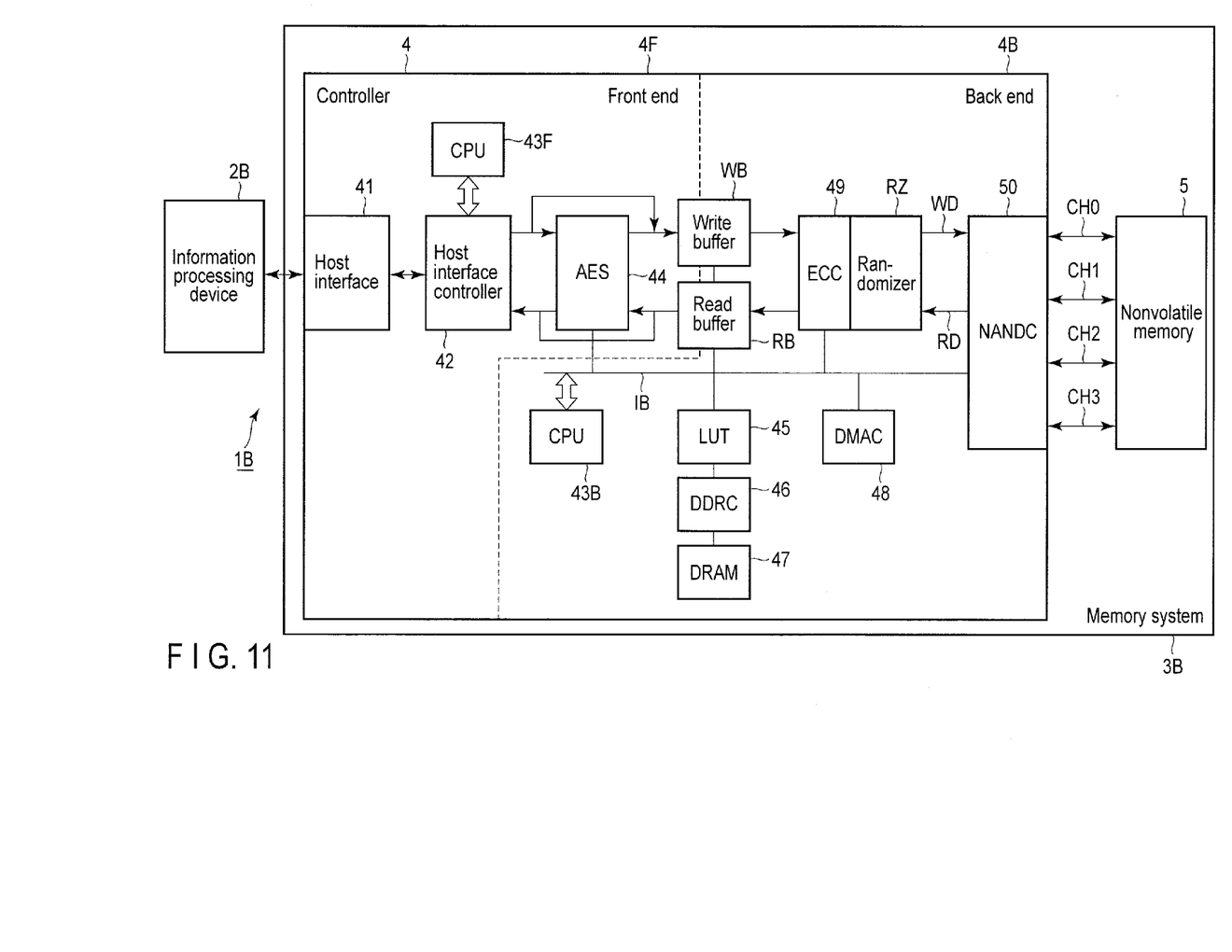
FIG. 11 is a block diagram showing an example of a structure of an information processing system according to a third embodiment.

FIG. 11 is a block diagram showing of an example of a detail structure of the information processing system 1 according to the present embodiment.

In FIG. 11, the information processing system 1B includes an information processing device 2B and a memory system 3B. The information processing system 1B may include a plurality of information processing devices as in the second embodiment. That is, the information processing devices 2 and D0 to DM of the first and second embodiments correspond to the information processing devices 2B.

The memory systems 3 and 3A according to the first and second embodiments correspond to the memory system 3B.

the processor 11 of the first and second embodiments corresponds to CPU 43F and 43B.

The address translation tables $T_0$ to $T_M$ according to the first embodiment and the translation table 20 of the second embodiment correspond to a LUT 45.

The memory unit 10 of the first and second embodiments corresponds to a DRAM 47.

The interface unit 19 according to the second embodiment corresponds to a host interface 41 and a host interface controller 42.

The buffer memories $F_0$ to $F_M$ of the first and second embodiments correspond to a write buffer WB and read buffer RB.

The information processing device 2B functions as a host device.

The controller 4 includes a front end 4F and a back end 4B.

The front end (host communication unit) 4F includes a host interface 41, host interface controller 42, encode/decode unit 44, and CPU 43F.

The host interface 41 communicates with the information processing device 2B to exchange requests (write command, read command, erase command), LBA, and data.

The host interface controller (control unit) 42 controls the communication of the host interface 41 based on the control of the CPU 43F.

The encode/decode unit (advanced encryption standard (AES)) 44 encodes the write data (plaintext) transmitted from the host interface controller 42 in a data write operation. The encode/decode unit 44 decodes encoded read data transmitted from the read buffer RB of the back end 4B in a data read operation. Note that the transmission of the write data and read data can be performed without using the encode/decode unit 44 as occasion demands.

The CPU 43F controls the above components 41, 42, and 44 of the front end 4F to control the whole function of the front end 4F.

The back end (memory communication unit) 4B includes a write buffer WB, read buffer RB, LUT unit 45, DDRC 46, DRAM 47, DMAC 48, ECC 49, randomizer RZ, NANDC 50, and CPU 43B.

The write buffer (write data transfer unit) WB stores the write data transmitted from the information processing device 2B temporarily. Specifically, the write buffer WB temporarily stores the write data until it reaches to a predetermined data size suitable for the nonvolatile memory 5.

The read buffer (read data transfer unit) RB stores the read data read from the nonvolatile memory 5 temporarily. Specifically, the read buffer RB rearranges the read data to be the order suitable for the information processing device 2B (the order of the logical address LBA designated by the information processing device 2B).

The LUT 45 is a data to translate the logical address LBA into a predetermined physical address PBA.

The DDRC 46 controls double data rate (DDR) in the DRAM 47.

The DRAM 47 is a nonvolatile memory which stores, for example, the LUT 45.

The direct memory access controller (DMAC) 48 transfers the write data and the read data through an internal bus IB. In FIG. 11, only a single DMAC 48 is shown; however, the controller 4 may include two or more DMACs 48. The DMAC 48 may be set in various positions inside the controller 4.

The ECC (error correction unit) 49 adds an error correction code (ECC) to the write data transmitted from the write buffer WB. When the read data is transmitted to the read buffer RB, the ECC 49, if necessary, corrects the read data read from the nonvolatile memory 5 using the added ECC.

The randomizer RZ (or scrambler) disperses the write data in such a manner that the write data are not biased in a certain page or in a word line direction of the nonvolatile memory 5 in the data write operation. By dispersing the write data in this manner, the number of write can be standardized and the cell life of the memory cell MC of the nonvolatile memory 5 can be prolonged. Therefore, the reliability of the nonvolatile memory 5 can be improved. Furthermore, the read data read from the nonvolatile memory 5 passes through the randomizer RZ in the data read operation.

The NAND controller (NANDC) 50 uses a plurality of channels (four channels CH0 to CH3 are shown in the Figure) to access the nonvolatile memory 5 in parallel in order to satisfy a demand for a certain speed.

The CPU 43B controls each component above (45 to 50, and RZ) of the back end 4B to control the whole function of the back end 4B.

Note that the structure of the controller 4 shown in FIG. 11 is an example and no limitation is intended thereby.

Figure 12:
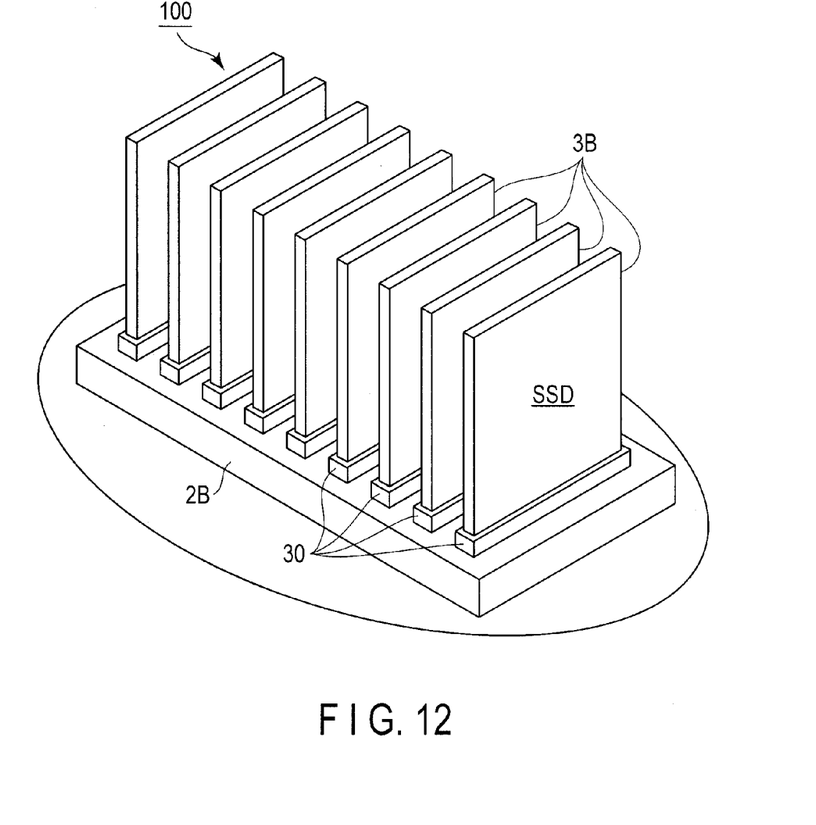
FIG. 12 is a perspective view showing a storage system according to the third embodiment.

FIG. 12 is a perspective view showing a storage system according to the present embodiment.

The storage system 100 includes the memory system 3B as an SSD.

The memory system 3B is, for example, a relatively small module of which external size will be approximately 20 mm×30 mm. Note that the size and scale of the memory system 3B is not limited thereto and may be changed into various sizes arbitrarily.

Furthermore, the memory system 3B may be applicable to the information processing device 2B as a server used in a data center or a cloud computing system employed in a company (enterprise) or the like. Thus, the memory system 3B may be an enterprise SSD (eSSD).

The memory system 3B includes a plurality of connectors (for example, slots) 30 opening upwardly, for example. Each connector 30 is a serial attached SCSI (SAS) connector or the like. With the SAS connector, a high speed mutual communication can be established between the information processing device 2B and each memory system 3B via a dual port of 6 Gbps. Note that, the connector 30 may be a PCI express (PCIe) or NVM express (NVMe).

A plurality of memory systems 3B are individually attached to the connectors 30 of the information processing device 2B and supported in such an arrangement that they stand in an approximately vertical direction. Using this structure, a plurality of memory systems 3B can be mounted collectively in a compact size, and the memory systems 3B can be miniaturized. Furthermore, the shape of each memory system 3B of the present embodiment is 2.5 inch small form factor (SFF). With this shape, the memory system 3B can be compatible with an enterprise HDD (eHDD) and the easy system compatibility with the eHDD can be achieved.

Note that the memory system 3B is not limited to the use in an enterprise HDD. For example, the memory system 3B can be used as a memory medium of a consumer electronic device such as a notebook portable computer or a tablet terminal.

As can be understood from the above, the information processing system 1B and the storage system 100 having the structure of the present embodiment can achieve a mass storage advantage with the same advantages of the first and second embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device communicating with a memory system, wherein
the memory system comprises a nonvolatile memory comprising a first namespace including first erase unit areas and a second namespace including second erase unit areas, and a controller controlling the nonvolatile memory,
the information processing device is external to the memory system, the information processing device comprises a processor executing first to fourth programs, and
the processor
assigns, when a first characteristic feature of a first logical address space corresponding to the first program and a second characteristic feature of a second logical address space corresponding to the second program are different, the first and second logical address spaces to the first namespace,
assigns, when a third characteristic feature of a third logical address space corresponding to the third program and a fourth characteristic feature of a fourth logical address space corresponding to the fourth program are different, the third and fourth logical address spaces to the second namespace,
transmits a write command, identification data of a namespace assigned to a logical address space corresponding to the write command, write data, and logical address of the write data, to the controller, and
transmits a read command, the identification data, and a logical address of read data, to the controller, and receives the read data from the controller.

2. The information processing device according to claim 1, wherein
the processor calculates first to fourth write frequencies for the first to fourth logical address spaces, and assigns the first and second logical address spaces to the first namespace, and assigns the third and fourth logical address spaces to the second namespace, based on the first to fourth write frequencies for the first to fourth logical address spaces.

3. The information processing device according to claim 1, wherein
the processor transmits the write command, the identification data of the namespace assigned to the logical address space of a program transmitting the write command, the write data, and a size of the write data.

4. A non-transitory computer readable recording medium which stores a program causing a computer to function as:
an assignment unit; and
a transmission unit, wherein
the computer communicates with a memory system and comprises a processor executing first to fourth programs,
the memory system comprises a nonvolatile memory comprising a first namespace including first erase unit areas and a second namespace including second erase unit areas, and a controller controlling the nonvolatile memory,
the assignment unit is external to the memory system, the assignment unit assigns, when a first characteristic feature of a first logical address space corresponding to the first program and a second characteristic feature of a second logical address space corresponding to the second program are different, the first and second logical address spaces to the first namespace,
the assignment unit assigns, when a third characteristic feature of a third logical address space corresponding to the third program and a fourth characteristic feature of a fourth logical address space corresponding to the fourth program are different, the third and fourth logical address spaces to the second namespace,
the transmission unit transmits identification data of a namespace assigned to a logical address space corresponding to the write command, write data, and a logical address of the write data, to the controller, and
the transmission unit transmits a read command, the identification data, and a logical address of read data, to the controller, and receives the read data from the controller.

5. The information processing device according to claim 1, wherein the first to fourth characteristic features are features other than an order of the first to fourth logical address spaces.

6. The non-transitory computer readable medium according to claim 4, wherein the first to fourth characteristic features are features other than an order of the first to fourth logical address spaces.

7. The information processing device of claim 1, wherein the processor assigns the first logical address space corresponding to the first program to the first namespace based on a first program identifier, assigns the second logical address space corresponding to the second program to the first namespace based on a second program identifier, assigns the third logical address space corresponding to the third program to the second namespace based on a third program identifier, and assigns the fourth logical address space corresponding to the fourth program to the second namespace based on a fourth program identifier.

8. The non-transitory computer readable recording medium according to claim 4, wherein the assignment unit assigns the first logical address space corresponding to the first program to the first namespace based on a first program identifier, assigns the second logical address space corresponding to the second program to the first namespace based on a second program identifier, assigns the third logical address space corresponding to the third program to the second namespace based on a third program identifier, and assigns the fourth logical address space corresponding to the fourth program to the second namespace based on a fourth program identifier.

9. An information processing system comprising the information processing device according to claim 1 and the memory system, wherein
the controller assigns the first erase unit areas to the first namespace and assigns the second erase unit areas to the second namespace,
receives the write command, the identification data, the write data, and the logical address, from the information processing device,
associates the logical address and the identification data with a physical address corresponding to the namespace indicated by the identification data, and
writes the write data at a position indicated by the physical address.

10. The information processing system according to claim 9, wherein the controller
receives the read command, the identification data, the logical address, from the information processing device,
translates the logical address into the physical address based on the logical address and the identification data associated with the physical address,
reads the read data from the position indicated by the physical address, and
sends the read data to the information processing device.

11. The information processing device of claim 1, wherein the first to fourth characteristic features are write frequencies.

12. The non-transitory computer readable medium according to claim 4, wherein the first to fourth characteristic features are write frequencies.

* * * * *